(12) United States Patent
Lu et al.

(10) Patent No.: US 10,965,416 B2
(45) Date of Patent: Mar. 30, 2021

(54) DATA TRANSMISSION METHOD AND APPARATUS

(71) Applicant: Huawei Technologies Co., Ltd., Shenzhen (CN)

(72) Inventors: Yawei Lu, Shenzhen (CN); Peng Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/504,016

(22) Filed: Jul. 5, 2019

(65) Prior Publication Data

US 2019/0334675 A1 Oct. 31, 2019

Related U.S. Application Data

(63) Continuation of application No. PCT/CN2018/071465, filed on Jan. 4, 2018.

(30) Foreign Application Priority Data

Jan. 6, 2017 (CN) .......................... 2017 1 0010473
Jun. 16, 2017 (CN) .......................... 2017 1 0459563

(51) Int. Cl.
*H04L 5/00* (2006.01)
*H04W 72/04* (2009.01)

(52) U.S. Cl.
CPC ....... *H04L 5/0048* (2013.01); *H04W 72/0446* (2013.01); *H04W 72/0453* (2013.01)

(58) Field of Classification Search
CPC ... H04L 5/0048; H04L 5/0094; H04L 1/1806; H04L 1/1812; H04W 72/0446; H04W 72/0453

See application file for complete search history.

(56) References Cited

U.S. PATENT DOCUMENTS

2010/0309863 A1* 12/2010 Sangiamwong .......... H04L 1/06
                                                              370/329
2012/0052795 A1*  3/2012 Shen ..................... H04L 1/1854
                                                              455/7

(Continued)

FOREIGN PATENT DOCUMENTS

CN       101917765 A     12/2010
CN       101932073 A     12/2010

(Continued)

OTHER PUBLICATIONS

R1-102895; "Views on layer to DMRS port mapping for retransmission"; 3GPP TSG-RAN WG1 #61; Montreal, Canada; May 10-14, 2010 (Year: 2010).*

(Continued)

*Primary Examiner* — Benjamin H Elliott, IV
(74) *Attorney, Agent, or Firm* — Slater Matsil, LLP (57) ABSTRACT

This application provides a data transmission method and an apparatus. The method includes: sending, by a first device, first indication information, where the first indication information is used to indicate a time-frequency resource of a first reference signal, and the first reference signal is used to perform channel estimation on retransmitted data of first data; and sending, by the first device, the retransmitted data.

22 Claims, 8 Drawing Sheets

(56) References Cited

U.S. PATENT DOCUMENTS

| | | | |
|---|---|---|---|
| 2012/0120842 A1* | 5/2012 | Kim | H04B 7/024 370/252 |
| 2013/0010745 A1* | 1/2013 | Ko | H04B 7/0617 370/329 |
| 2014/0044054 A1* | 2/2014 | Kim | H04W 72/0453 370/329 |
| 2015/0305059 A1 | 10/2015 | Li et al. | |
| 2015/0349932 A1* | 12/2015 | Onodera | H04L 5/0026 370/329 |
| 2016/0192385 A1* | 6/2016 | Tooher | H04L 5/0048 370/336 |
| 2016/0211960 A1* | 7/2016 | Wang | H04L 25/0224 |
| 2016/0286535 A1* | 9/2016 | Ji | H04L 5/0053 |
| 2016/0302189 A1* | 10/2016 | Bala | H04L 5/001 |
| 2017/0041115 A1* | 2/2017 | Baldemair | H04W 72/0446 |
| 2017/0251465 A1* | 8/2017 | Andersson | H04L 5/0048 |
| 2017/0265219 A1* | 9/2017 | Wang | H04W 72/1263 |
| 2017/0288837 A1* | 10/2017 | Namgoong | H04L 5/0007 |
| 2017/0338987 A1* | 11/2017 | Zhou | H04W 74/0833 |
| 2018/0054285 A1* | 2/2018 | Chen | H04L 1/1822 |
| 2018/0115990 A1* | 4/2018 | Abedini | H04W 74/006 |
| 2018/0131494 A1* | 5/2018 | Li | H04W 72/042 |
| 2019/0222362 A1* | 7/2019 | Beale | H04L 5/0064 |
| 2019/0253193 A1* | 8/2019 | Kim | H04L 5/0048 |
| 2019/0268208 A1* | 8/2019 | Seo | H04L 27/26 |
| 2019/0334675 A1* | 10/2019 | Lu | H04L 5/0094 |

FOREIGN PATENT DOCUMENTS

| | | |
|---|---|---|
| CN | 102142916 A | 8/2011 |
| CN | 102405627 A | 4/2012 |
| CN | 102469609 A | 5/2012 |
| CN | 105519181 A | 4/2016 |
| CN | 106487487 A | 3/2017 |
| EP | 2790345 A1 | 10/2014 |
| WO | 2015168940 A1 | 11/2015 |
| WO | 2016015340 A1 | 2/2016 |

OTHER PUBLICATIONS

English Translation of ISR for PCT/CN2018/071465; Mar. 28, 2018; retrieved from the internet on Aug. 10, 2020 (Year: 2018).*
3GPP TSG RAN WG1 Meeting #87 R1-1612536 Reno, USA, Nov. 14-18, 2016; "Evaluation Results of eMBB with HARQ Retransmission for Multiplexing eMBB and URLLC" (Year: 2016).*
Ericsson, "DMRS placement in transmission slots aggregation," 3GPP TSG-RAN WG1 #87 R1-1612328, Reno, USA, Nov. 14-18, 2016, 7 pages.
LG Electronics, "Discussion on Variable Density for NR DMRS," 3GPP TSG RAN WG1 Meeting #87, R1-1611814, Reno, USA, Nov. 14-18, 2016, 8 pages.

* cited by examiner

| A second device receives first indication information, where the first indication information is used to indicate a time-frequency resource of a first reference signal, and the first reference signal is used to perform channel estimation on retransmitted data of first data | ╱ 201 |

| The second device receives the retransmitted data | ╱ 202 |

DATA TRANSMISSION METHOD AND APPARATUS

CROSS-REFERENCE TO RELATED APPLICATIONS

This application is a continuation of International Application No. PCT/CN2018/071465, filed on Jan. 4, 2018, which claims priority to Chinese Patent Application No. 201710010473.3, filed on Jan. 6, 2017, and Chinese Patent Application No. 201710459563.0, filed on Jun. 16, 2017, The disclosures of the aforementioned applications are hereby incorporated by reference in their entireties.

TECHNICAL FIELD

The present invention relates to the communications field, and in particular, to a data transmission method and an apparatus.

BACKGROUND

In a wireless communications system, a reference signal (RS), also referred to as a pilot signal, is a known signal sent by a sending device to a receiving device on a known resource. The receiving device may obtain channel-related information based on the received reference signal, to complete channel estimation or channel measurement. A channel measurement result may be used for resource scheduling and link adaptation, and a channel estimation result may be used by the receiving device to demodulate data.

Figure 1:
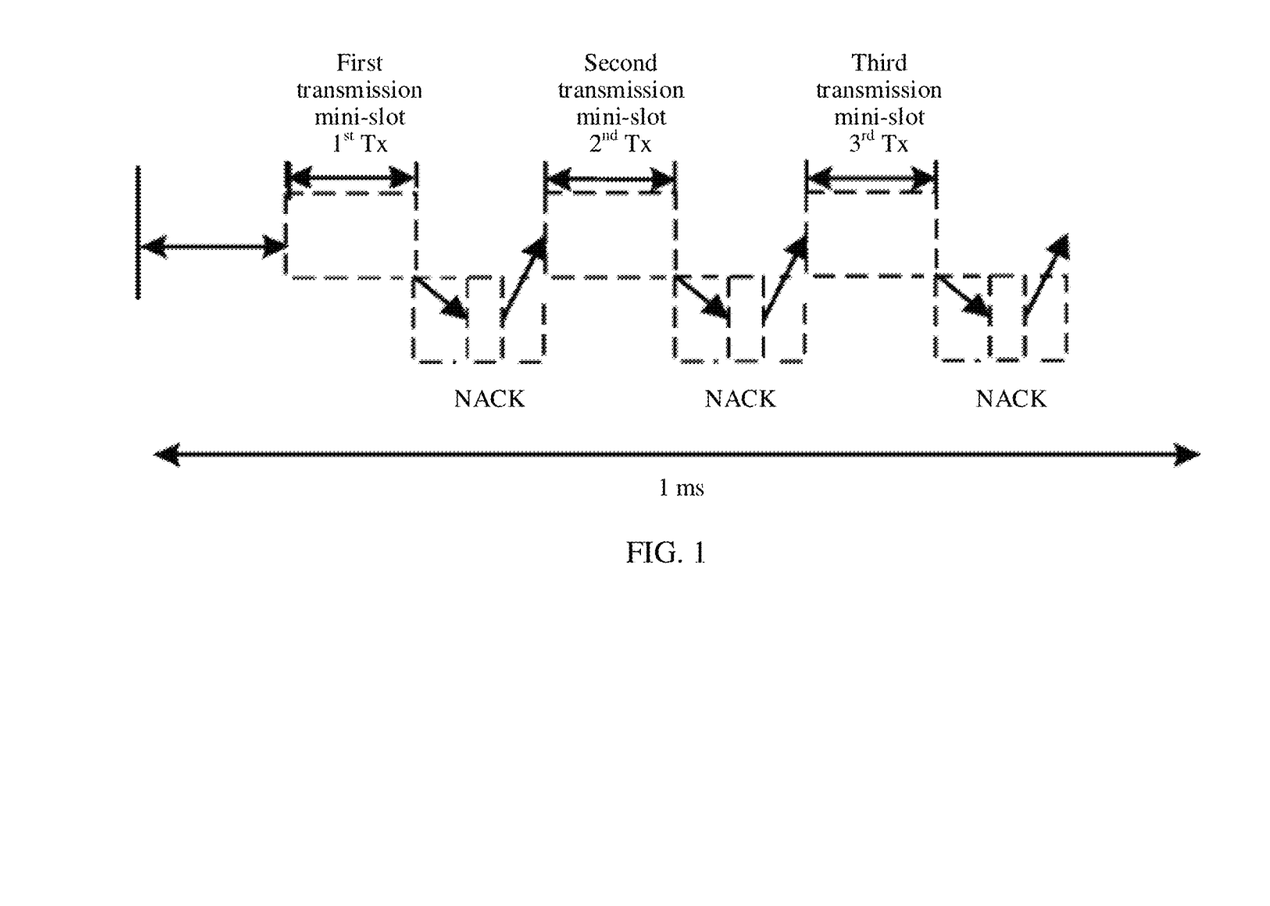
FIG. 1 is a schematic diagram of a transmission latency in a URLLC service according to an embodiment of this application.

An ultra-reliable and low latency communications (URLLC) service is an important service in a future mobile communications system. The URLLC service usually requires very high reliability (for example, 99.999%) and a very low latency (for example, 1 ms). A hybrid automatic repeat request (HARQ) technology may be used to improve reliability of the URLLC service. A URLLC packet may need to be transmitted a plurality of times. An interval between an initial transmission and a last retransmission usually does not exceed a latency of 1 ms required by the URLLC service, as shown in FIG. 1.

A current downlink reference signal design scheme in LTE cannot adapt to a new service such as the URLLC and a new application scenario, and data transmission efficiency is relatively low.

SUMMARY

This application provides a data transmission method and an apparatus, to improve data transmission efficiency. To resolve the foregoing technical problem, this application discloses the following technical solutions:

According to a first aspect, an embodiment of this application provides a data transmission method, and the method includes: sending, by a first device, first indication information, where the first indication information is used to indicate a time-frequency resource of a first reference signal, and the first reference signal is used to perform channel estimation on retransmitted data of first data; and sending, by the first device, the retransmitted data.

According to the method provided in this aspect, the first device sends the first indication information, the first indication information is used to indicate a time-frequency resource of a reference signal used for transmitting the first data for a second time or subsequently, and this time-frequency resource may be the same as or different from a time-frequency resource of a reference signal used for the initial transmission of the first data. When the time-frequency resource indicated by the first indication information is less than the time-frequency resource occupied by a reference signal used for the initial transmission of the first data, reference signal overheads can be reduced, and reference signal resource configuration flexibility and data transmission efficiency are improved.

In addition, a time interval between a subsequent $N^{th}$ transmission and the initial transmission is very short, and a channel changes very slightly. Therefore, a result of channel estimation performed by a second device that serves as a receive end is not affected when time-frequency resources of reference signals sparser than those in the initial transmission are configured, thereby further ensuring channel estimation accuracy while reducing reference signal overheads.

With reference to the first aspect, in a first implementation of the first aspect, the first indication information includes information used to indicate a time-frequency location of the first reference signal.

With reference to the first implementation of the first aspect, in a second implementation of the first aspect, the information about the time-frequency location includes at least one of a frequency domain spacing, a frequency domain offset, a time domain spacing, and a time domain offset. In this aspect, a time-frequency resource location of a reference signal used in subsequent transmission may be configured different from a location for the initial transmission. In other words, the reference signal has a frequency offset, so that in the $N^{th}$ transmission, a frequency domain location of the first reference signal and a frequency domain location of a second reference signal are staggered, thereby improving accuracy of a channel estimation result of a receiving device.

With reference to the first aspect, in a third implementation of the first aspect, the first indication information is further used to indicate that the first device does not send the first reference signal, in other words, the reference signal occupies no time-frequency resource, and overheads are the smallest.

With reference to any one of the first to the third implementations of the first aspect, in a fourth implementation of the first aspect, the method further includes: sending second indication information, where the second indication information is used to indicate a time-frequency resource of a second reference signal, and the second reference signal is used to perform channel estimation on an initial transmission of the first data. The first indication information and the second indication information may be sent simultaneously or may be sent in sequence. For example, the second indication information is sent first, and then the first indication information is sent.

With reference to the fourth implementation of the first aspect, in a fifth implementation of the first aspect, the second indication information includes a time-frequency location of the second reference signal.

With reference to the fifth implementation of the first aspect, in a sixth implementation of the first aspect, information about the time-frequency location includes at least one of a frequency domain spacing, a frequency domain offset, a time domain spacing, and a time domain offset.

With reference to any one of the fourth to the sixth implementations of the first aspect, in a seventh implementation of the first aspect, the time-frequency resource of the first reference signal includes R1 time-frequency resource units, the time-frequency resource of the second reference signal includes R2 time-frequency resource units, R1 is less than or equal to R2, R1 is an integer greater than or equal to 0, and R2 is a positive integer. When R1 is equal to 0, it indicates that no reference signal is carried during retransmission and no overheads are consumed. In this case, all resources may be used for data transmission, and reference signal overheads are the smallest.

With reference to any one of the first to the seventh implementations of the first aspect, in an eighth implementation of the first aspect, the first indication information is sent by using any one of physical layer control signaling, radio resource control layer signaling, and medium access control layer signaling.

With reference to any one of the fourth to the seventh implementations of the first aspect, in a ninth implementation of the first aspect, the second indication information is sent by using any one of physical layer control signaling, radio resource control layer signaling, and medium access control layer signaling.

According to a second aspect, an embodiment of this application provides a data transmission method, and the method includes: receiving, by a second device, first indication information, where the first indication information is used to indicate a time-frequency resource of a first reference signal, and the first reference signal is used to perform channel estimation on retransmitted data of first data; and receiving, by the second device, the retransmitted data.

According to the method provided in this aspect, the second device receives the first indication information, the first indication information is used to indicate a time-frequency resource of a reference signal used for transmitting the first data for a second time or subsequently, and this time-frequency resource configuration may be the same as or different from a time-frequency resource used for the initial transmission of the first data. When the time-frequency resource indicated by the first indication information is less than the time-frequency resource occupied by a reference signal used for the initial transmission of the first data, reference signal overheads can be reduced, and reference signal resource configuration flexibility and data transmission efficiency are improved.

With reference to the second aspect, in a first implementation of the second aspect, the first indication information includes information used to indicate a time-frequency location of the first reference signal.

With reference to the first implementation of the second aspect, in a second implementation of the second aspect, the information about the time-frequency location includes at least one of a frequency domain spacing, a frequency domain offset, a time domain spacing, and a time domain offset.

With reference to the second aspect, in a third implementation of the second aspect, the first indication information is further used to indicate that a first device does not send the first reference signal.

With reference to any one of the first to the third implementations of the second aspect, in a fourth implementation of the second aspect, the method further includes: receiving second indication information, where the second indication information is used to indicate a time-frequency resource of a second reference signal, and the second reference signal is used to perform channel estimation on an initial transmission of the first data.

With reference to the fourth implementation of the second aspect, in a fifth implementation of the second aspect, the second indication information includes a time-frequency location of the second reference signal.

With reference to the fifth implementation of the second aspect, in a sixth implementation of the second aspect, information about the time-frequency location includes at least one of a frequency domain spacing, a frequency domain offset, a time domain spacing, and a time domain offset.

With reference to any one of the fourth to the sixth implementations of the second aspect, in a seventh implementation of the second aspect, the time-frequency resource of the first reference signal includes R1 time-frequency resource units, the time-frequency resource of the second reference signal includes R2 time-frequency resource units, R1 is less than or equal to R2, R1 is an integer greater than or equal to 0, and R2 is a positive integer. When R1 is equal to 0, it indicates that no reference signal is carried during retransmission and no overheads are consumed. In this case, all resources may be used for data transmission, and reference signal overheads are the smallest.

With reference to any one of the first to the seventh implementations of the second aspect, in an eighth implementation of the second aspect, the second device receives the first indication information by using any one of physical layer control signaling, radio resource control layer signaling, and medium access control layer signaling.

With reference to any one of the fourth to the seventh implementations of the second aspect, in a ninth implementation of the second aspect, the second device receives the second indication information by using any one of physical layer control signaling, radio resource control layer signaling, and medium access control layer signaling.

According to a third aspect, an embodiment of this application provides a first device. The first device may serve as a sending device, and the device has a function of implementing the first aspect and the first to the ninth implementations of the first aspect. The function may be implemented by using hardware, or may be implemented by executing corresponding software by hardware. The hardware or software includes one or more modules corresponding to the foregoing function.

In a possible design, the first device includes an obtaining unit and a sending unit. The obtaining unit is configured to obtain first indication information, where the first indication information is used to indicate a time-frequency resource of a first reference signal, and the first reference signal is used to perform channel estimation on retransmitted data of first data. The sending unit is configured to send the first indication information. The sending unit is further configured to send the retransmitted data.

In a possible design, the sending unit is further configured to implement functions implemented by the first device in the first to the ninth implementations of the first aspect.

According to a fourth aspect, an embodiment of this application provides a second device. The second device may serve as a receiving device, and the device has a function of implementing the second aspect and the first to the ninth implementations of the second aspect. The function may be implemented by using hardware, or may be implemented by executing corresponding software by hardware. The hardware or software includes one or more modules corresponding to the foregoing function.

In a possible design, the second device includes a receiving unit and a processing unit. The receiving unit is configured to receive first indication information, where the first indication information is used to indicate a time-frequency resource of a first reference signal, and the first reference signal is used to perform channel estimation on retransmitted data of first data. The processing unit is configured to determine the time-frequency resource of the first reference signal based on the first indication information. The receiving unit is further configured to receive the retransmitted data.

In a possible design, the receiving unit is further configured to implement functions implemented by the second device in the first to the ninth implementations of the second aspect.

According to a fifth aspect, an embodiment of the present invention provides a first device, and the first device may serve as a sending device. The first device includes a processor and a transmitter. The processor is configured to support the first device in implementing functions of the obtaining unit in the embodiment of the third aspect, and the transmitter is configured to implement functions of the sending unit in the embodiment of the third aspect. The first device may further include a memory. The memory is configured to be coupled to the processor, and the memory stores a program instruction and data that are necessary for the first device.

According to a sixth aspect, an embodiment of the present invention provides a second device, and the second device may serve as a receiving device. The second device includes a processor and a transceiver. The processor is configured to support the second device in implementing functions of the processing unit in the embodiment of the fourth aspect, and the transceiver is configured to implement functions of the receiving unit in the embodiment of the fourth aspect. The second device may further include a memory. The memory is configured to be coupled to the processor, and the memory stores a program instruction and data that are necessary for the second device.

According to a seventh aspect, an embodiment of this application further provides a computer storage medium. The computer storage medium stores a program, and when the program is executed, some or all steps of the implementations of the data transmission methods according to the first aspect and the second aspect are performed.

According to an eighth aspect, a computer program product including an instruction is provided, and when the computer program product runs on a computer, the computer performs the method according to any one of the first aspect or the possible implementations of the first aspect.

According to a ninth aspect, a computer program product including an instruction is provided, and when the computer program product runs on a computer, the computer performs the method according to any one of the second aspect or the possible implementations of the second aspect.

According to the data transmission method and apparatus provided in this application, the sending device indicates a time-frequency resource of a reference signal used for data transmission, to improve flexibility of configuring the time-frequency resource of the reference signal and improve data transmission efficiency, and adapt to a new service such as URLLC and a new application scenario. In addition, in frequency domain, a frequency domain spacing between reference signals is configured to increase, to reduce overheads of the time-frequency resource occupied by the reference signal, and improve data transmission efficiency. In addition, the first indication information is used to indicate that the reference signal has a frequency domain offset, so that a frequency domain location of a reference signal used for initial transmission of the data and a frequency domain location of a reference signal used for retransmission of the data are staggered, thereby further improving accuracy of signal estimation performed by the receiving device.

DETAILED DESCRIPTION OF ILLUSTRATIVE EMBODIMENTS

The following clearly describes the technical solutions in the embodiments of this application with reference to the accompanying drawings in the embodiments of this application.

The embodiments of this application are applied to a communications system including at least one first device that serves as a sending device and at least one second device that serves as a receiving device. The sending device and the receiving device may be respectively any transmit end device and any receive end device that transmit data in a wireless manner. The sending device and the receiving device may be any device having a wireless receiving/sending function, including but not limited to: a NodeB, an evolved NodeB (eNodeB), a base station in a 5th generation (5G) communications system, a base station or a network device in a future communications system, an access node in a Wi-Fi system, a wireless relay node, a wireless backhaul node, and user equipment (UE).

The UE may also be referred to as a terminal, a mobile station (MS), a mobile terminal (MT), a remote terminal (RT), an access terminal (AT), a user agent (UA), or the like. The UE may communicate with one or more core networks by using a radio access network (RAN), or may access a distributed network in a self-organizing or grant-free manner; or the UE may access a wireless network in another manner for communication; or the UE may directly perform wireless communication with another UE. This is not limited in the embodiments of the present invention.

A data transmission method provided in the embodiments of this application may be applied to downlink data transmission, may be applied to uplink data transmission, and may also be applied to device-to-device (D2D) data transmission. For downlink data transmission, a sending device is a base station, and a corresponding receiving device is UE. For uplink data transmission, a sending device is UE, and a corresponding receiving device is a base station. For D2D data transmission, a sending device is UE, and a corresponding receiving device is also UE. This is not limited in the embodiments of the present invention.

The sending device and the receiving device in the embodiments of this application may be deployed on land, for example, an indoor, an outdoor, a handheld, or an in-vehicle device; may be deployed on a water surface; or may be deployed on a plane, a balloon, and a satellite in the air. The UE in the embodiments of the present invention may be a mobile phone, a tablet computer (Pad), a computer having a wireless sending/receiving function, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like.

The data transmission method provided in the embodiments of this application may be applied to various communications systems, such as a 4G system, a 4.5G system, and a 5G system. An application scenario is not limited in this application.

Figure 2:
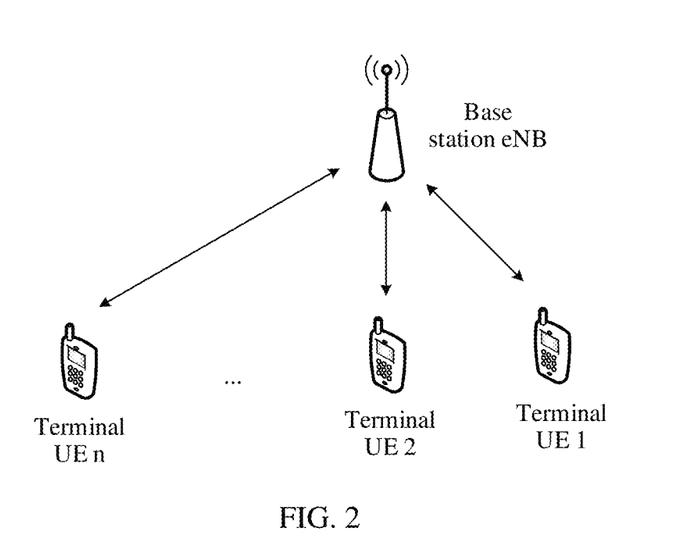
FIG. 2 is a schematic diagram of a communications system scenario that is applied to a data transmission method according to an embodiment of this application.

As shown in FIG. 2, an embodiment provides a communications system scenario that is applied to the data transmission method, and this application scenario includes a base station and at least one terminal device. The base station may be a node, in a cellular network, that provides a data access service for the terminal device, and the terminal device may be various UEs that communicate with the base station in the cellular network.

The data transmission method provided in the embodiments may be applied to transmission of data such as a URLLC service or an eMBB service. In the URLLC service, a time interval between an initial transmission and retransmission of data is very short, and usually does not exceed a latency of 1 ms, and a channel changes very slightly in a data transmission process. Based on this feature, a time-frequency resource of a reference signal used for data transmission is indicated by using indication information, so that resource configuration flexibility and data transmission efficiency are improved.

Figure 3:
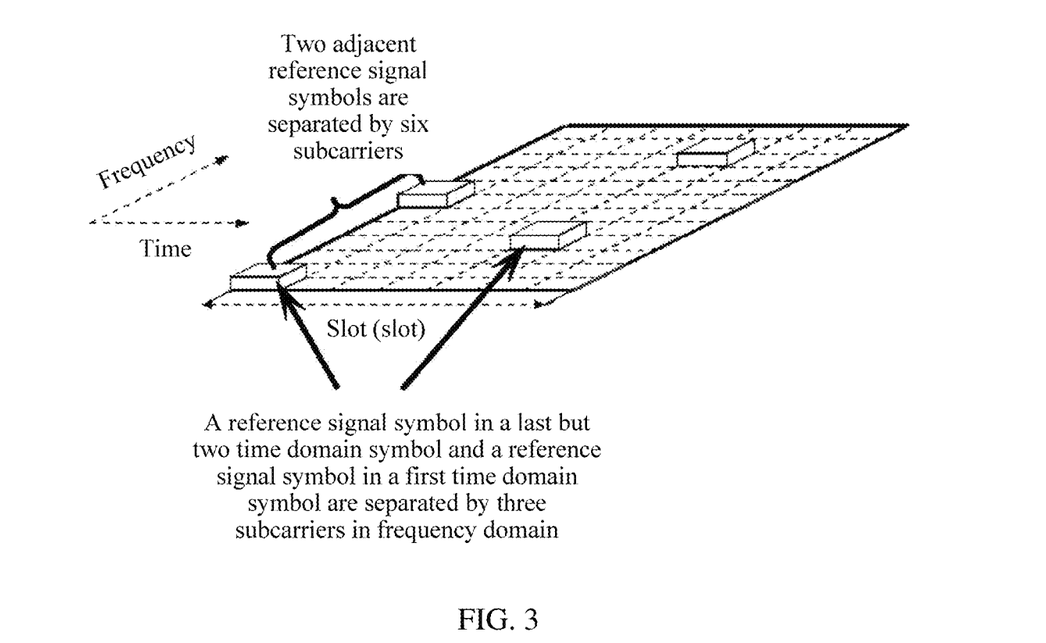
FIG. 3 is a schematic diagram of a time-frequency resource of a reference signal according to an embodiment of this application.

FIG. 3 is a schematic diagram of a time-frequency resource of a reference signal. A physical resource block (PRB) includes a plurality of (for example, 84) resource elements (RE), and each RE may be used to carry one reference signal symbol. FIG. 3 shows a quantity and locations of reference signal symbols configured on a PRB in one slot (In a first time domain symbol, two adjacent reference signal symbols are separated by six subcarriers (5 REs), and a reference signal symbol in a last but two time domain symbol and a reference signal symbol in the first time domain symbol are separated by three subcarriers in frequency domain. The time domain symbol herein may be an orthogonal frequency division multiplexing (OFDM) symbol, or may be a single carrier frequency division multiple access (SC-FDMA) symbol.

Figure 4:
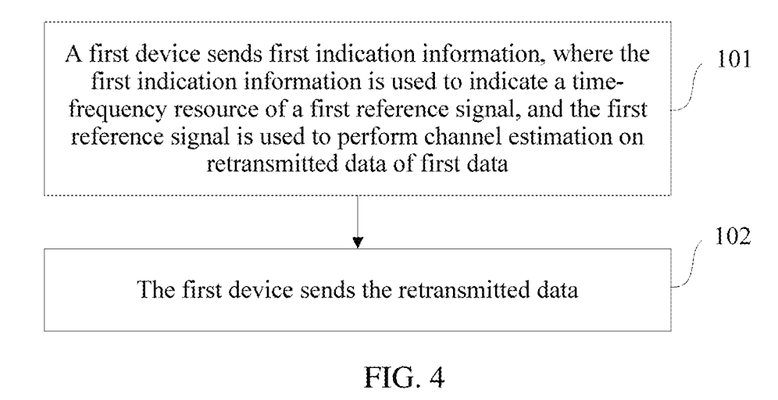
FIG. 4 is a schematic flowchart of a data transmission method according to an embodiment of this application.

Further, as shown in FIG. 4, a method provided in an embodiment includes the following steps.

Step 101: A first device sends first indication information, where the first indication information is used to indicate a time-frequency resource of a first reference signal, and the first reference signal is used to perform channel estimation on retransmitted data of first data.

Optionally, the first device sends second indication information. The second indication information is used to indicate a time-frequency resource of a second reference signal, and the second reference signal is used to perform channel estimation on an initial transmission of the first data.

Optionally, the time-frequency resource of the first reference signal includes R1 time-frequency resource units, the time-frequency resource of the second reference signal includes R2 time-frequency resource units, R1 is less than or equal to R2, R1 is an integer greater than or equal to 0, and R2 is a positive integer. The time-frequency resource unit herein may be an RE.

The first device may simultaneously send the first indication information and the second indication information, or may send the first indication information and the second indication information in sequence. For example, the first device sends the second indication information first, and then sends the first indication information. This is not limited in this embodiment.

Step 102: The first device sends the retransmitted data.

The first indication information and the second indication information may be sent by using any one of physical layer control signaling, radio resource control (RRC) layer signaling, and medium access control (MAC) layer signaling. The physical layer control signaling has highest real-time performance, but high signaling overheads. The RRC layer signaling has lowest overheads, but a largest latency. Specific signaling in the foregoing three types of signaling that is used to send the first indication information and/or the second indication information may be determined based on a requirement and an application scenario.

Specifically, in step 101, the first device sends the first indication information, the first indication information includes information used to indicate a time-frequency location of the first reference signal, and the information about the time-frequency location includes at least one of a frequency domain spacing, a frequency domain offset, a time domain spacing, and a time domain offset.

The first indication information indicates the time-frequency location of the first reference signal in two manners. One manner is an absolute indication manner. To be specific, the time-frequency location of the first reference signal in a resource block is directly indicated, for example, may be indicated in the following three dimensions: a time-frequency location of a first reference signal symbol in an RB, a frequency domain spacing between two adjacent reference signal symbols, and a time domain spacing between two adjacent reference signal symbols. The frequency domain spacing is a quantity of REs, and the time domain spacing is a quantity of time domain symbols. The other manner is a relative indication manner. To be specific, a change of the time-frequency location of the first reference signal relative to a time-frequency location of the second reference signal is indicated. Specifically, at least one of the following may be indicated: a change amount of a frequency domain spacing, an offset amount in frequency domain, a change amount of a time domain spacing, and an offset amount in time domain.

Figure 5:
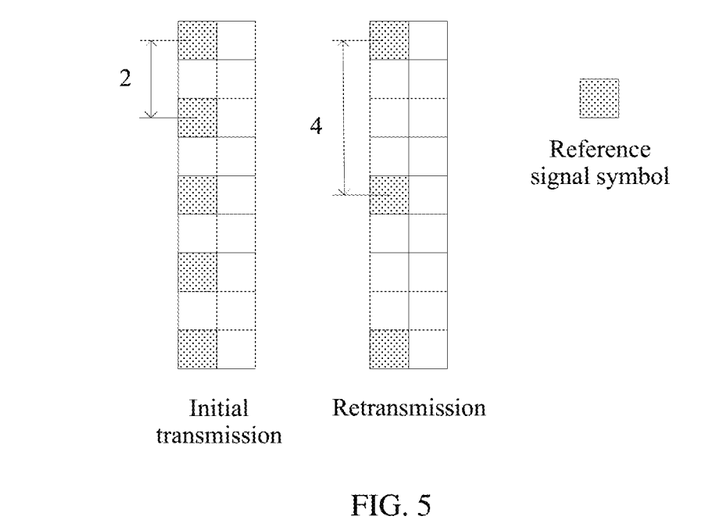
FIG. 5 is a schematic diagram showing that a frequency domain spacing between reference signals in retransmission of first data increases relative to a frequency domain spacing between reference signals in initial transmission of the first data according to an embodiment of this application.

Configuration manner 1: Configure a frequency domain spacing between reference signals in retransmission to increase.

FIG. 5 is a schematic diagram showing that a frequency domain spacing between reference signals in retransmission of the first data increases relative to a frequency domain spacing between reference signals in initial transmission of the first data. During initial transmission of the first data, a location spacing between two adjacent reference signal symbols in a same time domain symbol is one RE. During retransmission, a spacing between two adjacent reference signal symbols is three REs, and in this way, time-frequency resources occupied by the reference signals during retransmission are reduced, and overheads are reduced.

Figure 6:
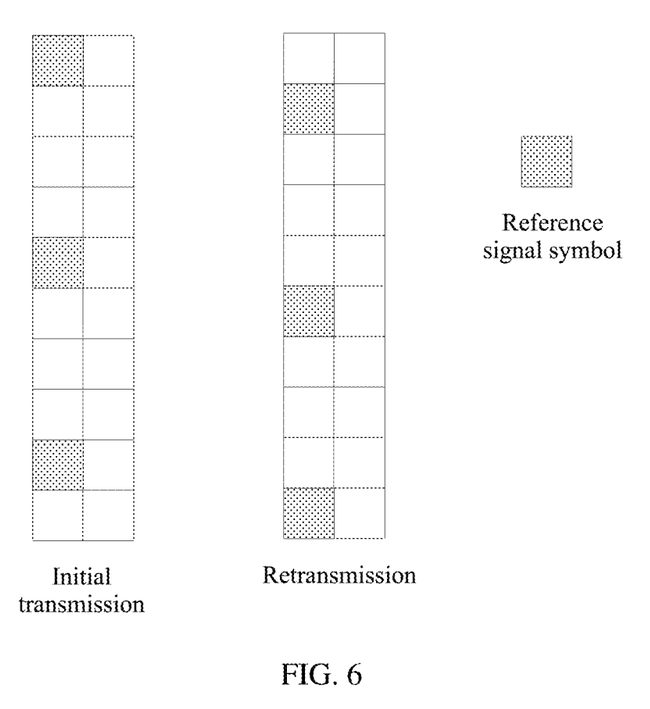
FIG. 6 is a schematic diagram showing that a reference signal in retransmission of first data has a frequency domain offset relative to a reference signal in initial transmission of the first data according to an embodiment of this application.

Configuration manner 2: Configure a reference signal in retransmission to have a frequency domain offset.

FIG. 6 is a schematic diagram showing that a reference signal in retransmission of the first data has a frequency domain offset relative to a reference signal in initial transmission of the first data. A first reference signal symbol sent by the first device has an offset of one RE in frequency domain relative to a second reference signal symbol, so that a frequency domain location of a reference signal symbol in retransmission and a frequency domain location of a reference signal symbol in initial transmission are staggered, thereby further improving accuracy of channel estimation performed by a second device.

Configuration manner 3: Configure a frequency domain spacing between reference signals in retransmission to increase, and configure the reference signal to have a frequency domain offset.

The first indication information sent by a sending device is used to indicate that a frequency domain spacing between first reference signals is greater than a frequency domain spacing between second reference signals, to reduce reference signal overheads during retransmission. In addition, the first indication information sent by the sending device is used to indicate that the first reference signal has a frequency domain offset relative to the second reference signal, so that the first reference signal and the second reference signal are staggered in frequency domain, thereby improving accuracy of channel estimation performed by a receiving device.

It should be noted that a specific manner in the foregoing three configuration manners that is specifically used by the first device may be determined based on a current quantity of transmission times or a sequence number of a redundancy version. This is not limited in this embodiment of this application.

A time-frequency resource location of a reference signal may alternatively be determined and configured by using a formula. For example, FIG. 3 shows a method for configuring a time-frequency resource of a reference signal, and a frequency domain location of each reference signal is set by using a predefined formula.

According to the data transmission method provided in this application, for a feature that a wireless channel of a user service changes very slightly in a short latency, the sending device configures a time-frequency resource of a reference signal used for retransmitting data to be different from a time-frequency resource of a reference signal used for initially transmitting the data, to improve flexibility of configuring the time-frequency resource of the reference signal and improve data transmission efficiency, and adapt to a new service such as a URLLC service and a new application scenario. In addition, the first indication information is used to indicate that there is a frequency domain offset between the first reference signal and the second reference signal, so that a frequency domain location of the reference signal used for initially transmitting the data and a frequency domain location of the reference signal used for retransmitting the data are staggered, thereby further improving accuracy of signal estimation performed by the receiving device.

In another embodiment of this application, to further reduce reference signal resource overheads, during retransmission, no reference signal is sent, and no reference signal overheads are consumed.

Figure 7:
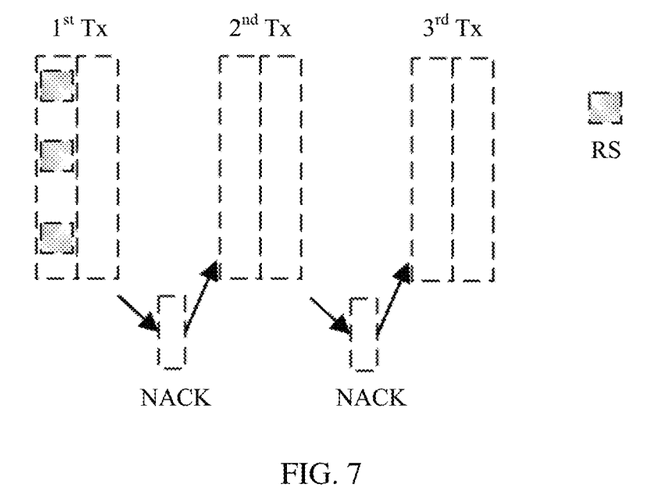
FIG. 7 is a schematic diagram of indicating that no reference signal is carried in subsequent transmission according to an embodiment of this application.

As shown in FIG. 7, the first indication information sent by the first device is further used to indicate that the first reference signal is not sent during retransmission of the first data. For example, in a second transmission and a third transmission of the first data, the first indication information indicates that the reference signal is configured on none of time-frequency resources, and R1 is equal to 0, thereby greatly reducing reference signal overheads in comparison with an existing method in which a same reference signal configuration is used in each transmission of the first data.

Figure 8:
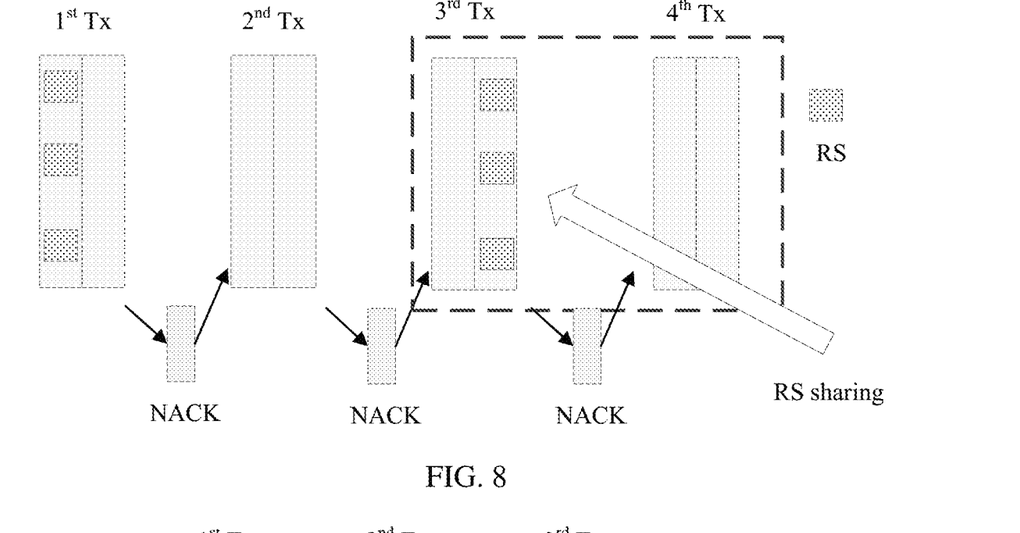
FIG. 8 is a schematic diagram of indicating a time-frequency resource of a subsequent reference signal according to an embodiment of this application.

Referring to FIG. 8, this application further provides an embodiment of a method for transmitting first data four times. To reduce reference signal resource overheads and ensure channel estimation quality, when the first device retransmits the first data, a reference signal is configured in some retransmission, and no reference signal is configured in some other retransmission.

As shown in FIG. 8, indication information sent by the first device indicates that no reference signal is sent in a second transmission and a fourth transmission of the first data, and a reference signal is configured in an initial transmission and a third transmission of the first data. In addition, to improve accuracy of channel estimation performed by the second device, in the third transmission of the first data, the first reference signal has a time domain offset relative to the second reference signal. The second reference signal is located in a first time domain symbol in one transmission, and the first reference signal is located in a second time domain symbol in one transmission.

Figure 9:
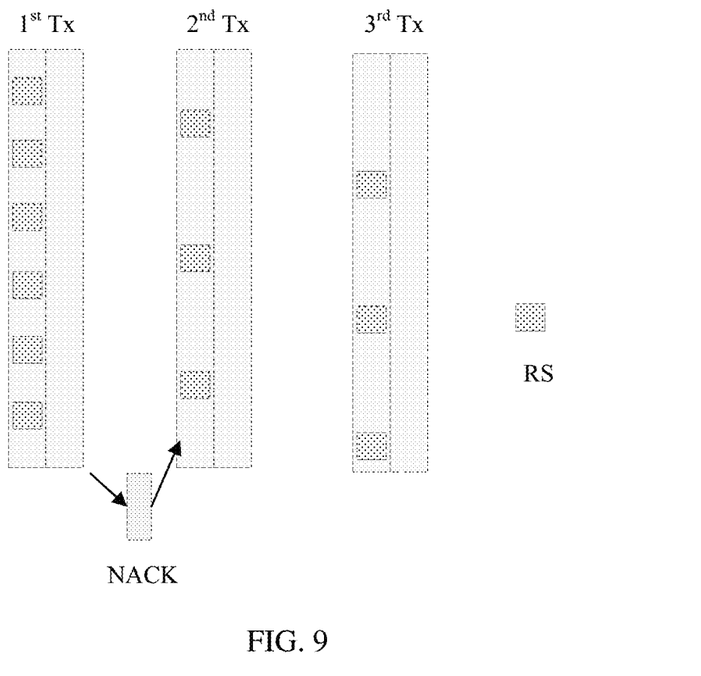
FIG. 9 is a schematic diagram of a reference signal indication that is based on feedback information according to an embodiment of this application.

In still another embodiment, when sending the first indication information, the first device further receives feedback information for transmission of the first data from the second device. The feedback information includes an acknowledgement (ACK) and a negative acknowledgement (NACK). As shown in FIG. 9, the first device generates the first indication information based on the ACK/NACK feedback information. When receiving NACK information from the second device, the first device generates the first indication information, and sends the first indication information to the second device.

In addition, the first device may further blindly retransmit the first data, to be specific, actively retransmit the first data before receiving the ACK/NACK fed back by the second device. Correspondingly, the first device sends the first indication information, to indicate a time-frequency resource of the first reference signal used by the first device to retransmit the first data.

An embodiment of this application further provides a method for determining a time-frequency resource of a reference signal in a predefined manner. A first device and a second device predefine a time-frequency resource of a reference signal used in each data transmission, and the first device does not need to send indication information to the second device, thereby reducing control signaling overheads.

Specifically, it is predefined that the time-frequency resource of the reference signal used in each data transmission may be the same as a time-frequency resource that is of a reference signal and that is indicated in the foregoing embodiments. For example, a frequency domain spacing between two adjacent reference signal symbols of a reference signal used in initial transmission of first data is 2, and a frequency domain spacing between two adjacent reference signal symbols of a reference signal used in retransmission of the first data is 4. If a time interval between the retransmission of the first data and the initial transmission of the first data is greater than a time threshold, for example, 1 ms, the frequency domain spacing between two adjacent reference signal symbols of the reference signal used in the retransmission of the first data is reconfigured as two REs. In addition, a frequency domain offset of a reference signal symbol may also be bound to a quantity of transmission times of the first data. For example, a frequency domain offset of a reference signal used in a first retransmission of the first data is set to one RE, and a frequency domain offset of a reference signal used in a second retransmission of the first data is set to three REs. The frequency domain offset is set, so that a frequency domain location of a reference signal used to retransmit data and a frequency domain location of a reference signal used to initially transmit the data are staggered, thereby improving accuracy of a channel estimation result.

Figure 10:
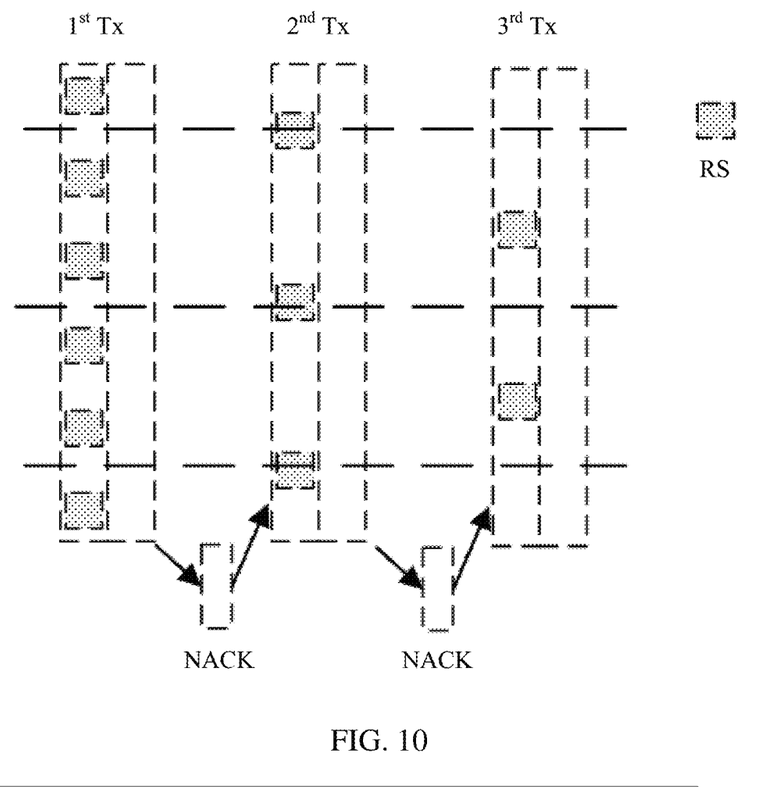
FIG. 10 is a schematic diagram of another reference signal indication according to an embodiment of this application.

FIG. 10 shows time-frequency resource configurations of reference signals used for initial transmission and retransmission of first data. In an initial transmission, a frequency domain spacing between second reference signals is two REs, and a frequency domain offset is 0. In a second transmission, a frequency domain spacing between first reference signals is four REs, and a frequency domain offset is one RE. In a third transmission, a frequency domain spacing between first reference signals is four REs, and a frequency domain offset is three REs. A sending device may notify a receiving device of a time-frequency resource of a reference signal by using a signaling notification, or a time-frequency resource of a reference signal used in each data transmission may be predefined in the foregoing predefined manner. The signaling notification may be physical layer signaling, medium access control layer signaling, or radio resource control layer signaling.

Figure 11:
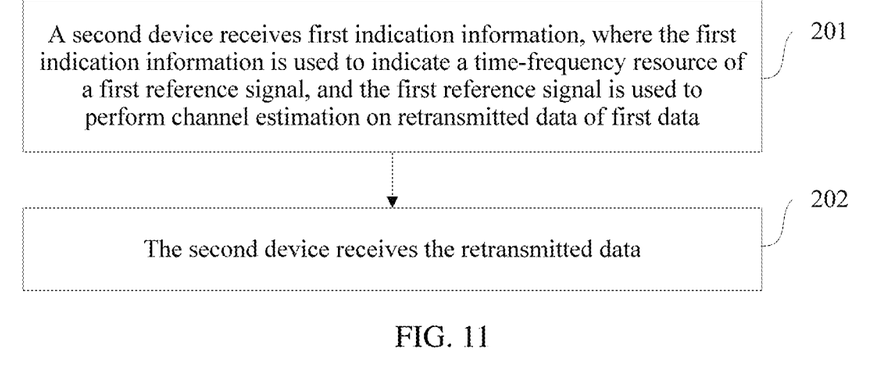
FIG. 11 is a schematic flowchart of another data transmission method according to an embodiment of this application.

An embodiment further provides a data transmission method, and the method is applied to a second device. Specifically, as shown in FIG. 11, the method includes the following steps.

Step 201: The second device receives first indication information, where the first indication information is used to indicate a time-frequency resource of a first reference signal, and the first reference signal is used to perform channel estimation on retransmitted data of first data. The second device determines, based on the first indication information, the time-frequency resource of the first reference signal used for retransmitting data.

After receiving the first indication information, the second device obtains a time-frequency location of the first reference signal, and performs, based on the first reference signal, channel estimation on a wireless channel through which the first data is retransmitted.

Step 202: The second device receives the retransmitted data.

The first indication information includes information used to indicate the time-frequency location of the first reference signal, and the information about the time-frequency location includes at least one of a frequency domain spacing, a frequency domain offset, a time domain spacing, and a time domain offset. In addition, the first indication information may be further used to indicate that a first device does not send the first reference signal.

Further, the method further includes: receiving second indication information, where the second indication information is used to indicate a time-frequency resource of a second reference signal, and the second reference signal is used to perform channel estimation on an initial transmission of the first data.

The time-frequency resource of the first reference signal includes R1 time-frequency resource units, the time-frequency resource of the second reference signal includes R2 time-frequency resource units, R1 is less than or equal to R2, R1 is an integer greater than or equal to 0, and R2 is a positive integer. When R1 is equal to 0, it indicates that the first reference signal is not sent, and reference signal overheads are the smallest. A saved time-frequency resource may be used for data transmission, thereby improving data transmission efficiency.

Further, the method provided in this embodiment further includes: receiving, by the second device, initially transmitted data of the first data or the retransmitted data of the first data, and generating an ACK/NACK verification result; if the initially transmitted data of the first data or the retransmitted data of the first data is correctly received, generating an ACK, or otherwise, generating a NACK; and sending, by the second device, the ACK/NACK to the first device.

In addition, the second device may further obtain a frequency domain spacing between reference signals and a frequency domain offset of a reference signal through blind detection. Both a possible frequency domain spacing and a possible frequency domain offset of the reference signal are known. Therefore, a combination of a frequency domain spacing and a frequency domain offset is also known. The second device may blindly detect the reference signal based on a combination of the possible frequency domain spacing and the possible frequency domain offset.

The second device may alternatively obtain, by using a combination of the foregoing several manners, information about a time-frequency resource of a reference signal used in current data transmission.

It may be understood that the foregoing data transmission method applied to the second device is corresponding to the foregoing data transmission method applied to the first device. For related implementations and steps, correspondingly refer to the method embodiment of the first device. Details are not described herein again.

In the foregoing embodiment, when a time interval between retransmission and initial transmission of the first data is less than a predefined threshold, for example, 1 ms, during receiving of the retransmitted data of the first data, the second device may reuse a channel estimation result obtained by using a second reference signal during the initial transmission of the first data. In other words, the second device demodulates the retransmitted data of the first data by using the channel estimation result obtained during the initial transmission of the first data. Correspondingly, the first device may not send the first reference signal when retransmitting the first data.

If control information sent by the first device to the second device carries valid-time information of a reference signal, and the first device has sent data in a valid-time window, the second device may demodulate the control information by using a channel estimation result in a cache, to know whether there is data for the second device in current transmission. If a valid time of the reference signal expires, the second device may discard the channel estimation result in the cache. If there is no reference signal in subsequent data transmission, the second device may be incapable of correctly demodulating subsequently transmitted data. The valid time is not limited to a fixed value, and the valid time may be changed by using control signaling.

In this embodiment, the valid time of the reference signal is set, so that the second device may determine, based on the valid-time information, whether to use a previous channel estimation result, thereby further improving accuracy of the channel estimation result.

It should be noted that the method provided in the foregoing embodiment includes but is not limited to a URLLC service, and this solution may also be used for another service if a channel changes slightly between a plurality of times of transmission. A definition of the plurality of times of transmission is not limited to initial transmission and retransmission. If a user needs to send a plurality of consecutive data packets, a same frequency domain resource is used, a time interval between two times of initial transmission is relatively short, and a channel changes slightly, this solution is also applicable.

It may be understood that the foregoing method embodiments are not limited to reference signal reuse between retransmission and initial transmission. More generally, the foregoing method embodiments may be used for reference signal reuse between an $(N+M)^{th}$ transmission and an $N^{th}$ transmission of the first data. Both N and M are positive integers.

When a frequency domain resource used in the $(N+M)^{th}$ transmission of the first data overlaps a frequency domain resource used in the $N^{th}$ transmission of the first data, for an overlapping part of the $(N+M)^{th}$ transmission and the $N^{th}$ transmission in frequency domain, a reference signal used in the $(N+M)^{th}$ transmission may be obtained with reference to the foregoing method embodiments; to be specific, reference signal reuse between two times of transmission is performed with reference to the foregoing embodiments; and for a non-overlapping area, a reference signal used in the $(N+M)^{th}$ transmission may be obtained with reference to the foregoing method embodiments or may be separately determined. For the non-overlapping area, if a reference signal used in the $N^{th}$ transmission is reused in the $(N+M)^{th}$ transmission according to the foregoing method embodiments, data receiving performance may be affected in some scenarios. Therefore, the reference signal used in the $(N+M)^{th}$ transmission in the non-overlapping area may be separately determined.

Figure 11A:
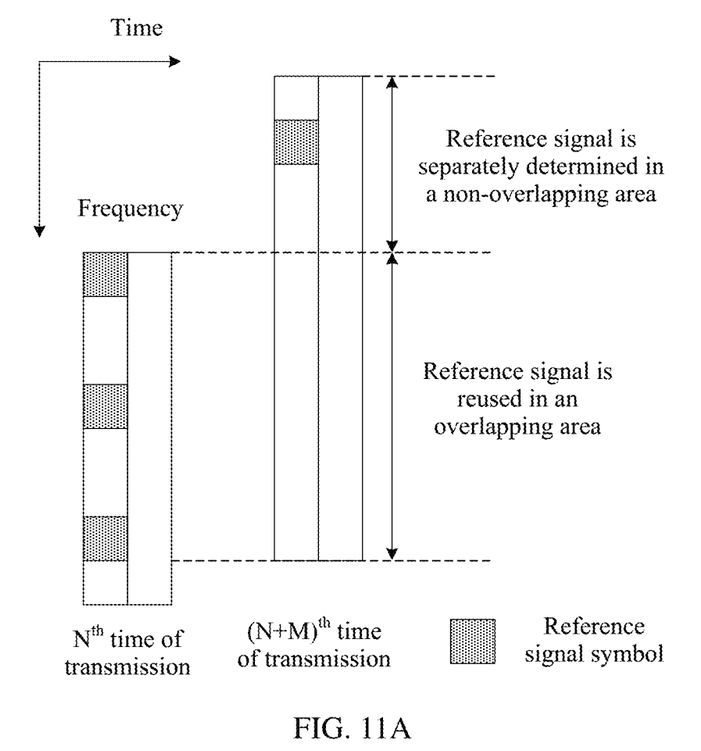
FIG. 11A is a schematic diagram of reference signal reuse according to an embodiment of this application.

FIG. 11A is a schematic diagram of reference signal reuse according to an embodiment of this application. As shown in FIG. 11A, in a frequency domain overlapping area, a reference signal used in an $N^{th}$ transmission of first data is reused, by using the methods shown in FIG. 5 to FIG. 10, as a reference signal used in an $(N+M)^{th}$ transmission of the first data; and in a non-overlapping area, a reference signal used in the $(N+M)^{th}$ transmission of the first data is separately determined. The reference signal in the non-overlapping area may be predefined, or may be determined by the first indication information or the second indication information in the foregoing method embodiments.

Figure 12:
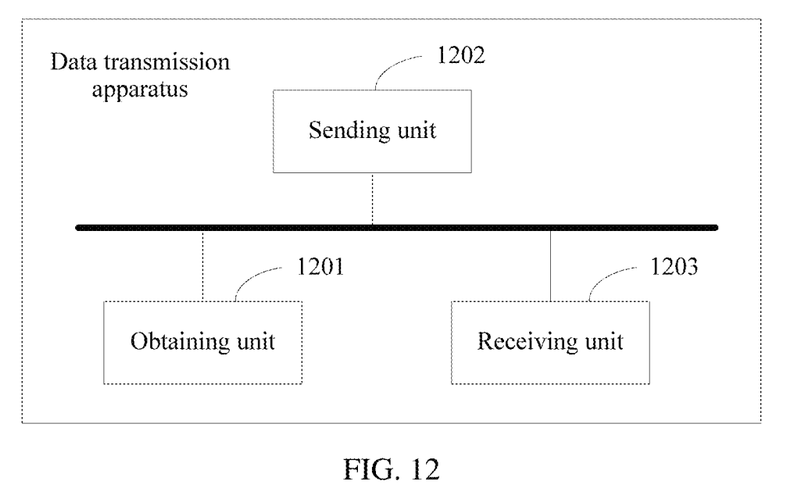
FIG. 12 is a schematic structural diagram of a data transmission apparatus according to an embodiment of this application.

As shown in FIG. 12, an embodiment further provides a data transmission apparatus. The data transmission apparatus is configured to implement functions of the first device that serves as a sending device in the foregoing method embodiments, and the apparatus includes an obtaining unit 1201 and a sending unit 1202.

The obtaining unit 1201 is configured to obtain first indication information. The first indication information is used to indicate a time-frequency resource of a first reference signal, and the first reference signal is used to perform channel estimation on retransmitted data of first data.

The sending unit 1202 is configured to send the first indication information, and is further configured to send the retransmitted data.

Further, the first indication information includes information used to indicate a time-frequency location of the first reference signal, and the information about the time-frequency location includes at least one of a frequency domain spacing, a frequency domain offset, a time domain spacing, and a time domain offset. In addition, the first indication information may be further used to indicate that the first device does not send the first reference signal.

Further, the sending unit 1202 is further configured to send second indication information. The second indication information is used to indicate a time-frequency resource of a second reference signal, and the second reference signal is used to perform channel estimation on an initial transmission of the first data. The time-frequency resource of the first reference signal includes R1 time-frequency resource units, the time-frequency resource of the second reference signal includes R2 time-frequency resource units, R1 is less than or equal to R2, R1 is an integer greater than or equal to 0, and R2 is a positive integer.

Further, the sending unit 1202 is further configured to send the first indication information and/or the second indication information by using any one of physical layer control signaling, radio resource control layer signaling, and medium access control layer signaling.

Optionally, the apparatus further includes a receiving unit 1203, configured to receive ACK/NACK information from a second device.

Optionally, the obtaining unit 1201 generates the first indication information based on the received NACK information from the second device.

Further, the obtaining unit 1201 is configured to generate the first indication information, and may be further configured to generate the second indication information. Further, the obtaining unit 1201 is further configured to generate the first indication information based on the received NACK information from the second device. Optionally, the obtaining unit 1201 may be further configured to generate the second indication information based on the received ACK information from the second device.

Figure 13:
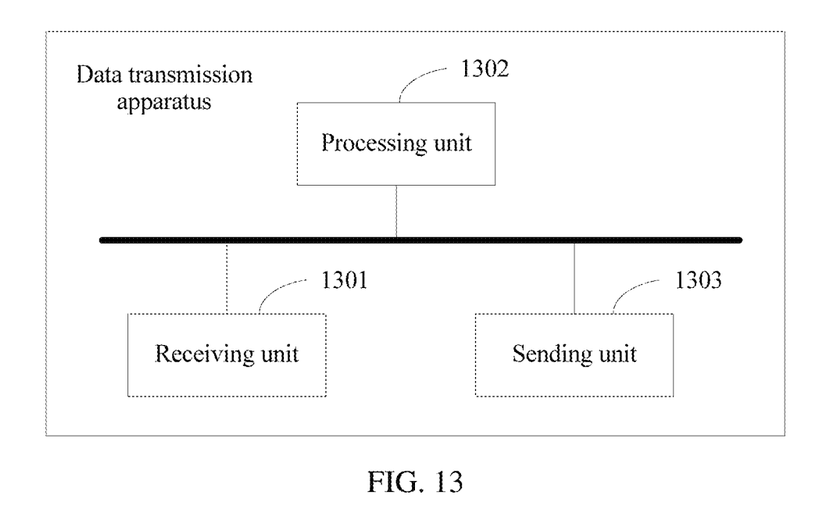
FIG. 13 is a schematic structural diagram of a first device according to an embodiment of this application.

As shown in FIG. 13, an embodiment further provides another data transmission apparatus. The data transmission apparatus is used to implement functions of the second device that serves as a receiving device in the foregoing method embodiments. The apparatus includes a receiving unit 1301 and a processing unit 1302.

The receiving unit 1301 is configured to receive first indication information. The first indication information is used to indicate a time-frequency resource of a first reference signal, and the first reference signal is used to perform channel estimation on retransmitted data of first data.

The processing unit 1302 is configured to determine the time-frequency resource of the first reference signal based on the first indication information.

The receiving unit 1301 is further configured to receive the retransmitted data.

Optionally, the first indication information includes information used to indicate a time-frequency location of the first reference signal, and the information about the time-frequency location includes at least one of a frequency domain spacing, a frequency domain offset, a time domain spacing, and a time domain offset.

After the receiving unit 1301 receives the first indication information, the processing unit 1302 determines the time-frequency location of the first reference signal based on the information about the time-frequency location of the first reference signal.

Further, the processing unit 1302 further performs, based on the first reference signal, channel estimation on a wireless channel through which the first data is retransmitted.

The first indication information includes the information used to indicate the time-frequency location of the first reference signal, and the information about the time-frequency location includes at least one of the frequency domain spacing, the frequency domain offset, the time domain spacing, and the time domain offset. In addition, the first indication information may be further used to indicate that a first device does not send the first reference signal.

Further, the receiving unit 1301 is further configured to receive second indication information. The second indication information is used to indicate a time-frequency resource of a second reference signal, and the second reference signal is used to perform channel estimation on an initial transmission of the first data. The processing unit 1302 is further configured to estimate a channel status of the initial transmission based on the second indication information.

The time-frequency resource of the first reference signal includes R1 time-frequency resource units, the time-frequency resource of the second reference signal includes R2 time-frequency resource units, R1 is less than or equal to R2, R1 is an integer greater than or equal to 0, and R2 is a positive integer. When R1 is equal to 0, it indicates that the first reference signal is not sent, and reference signal overheads are the smallest. A saved time-frequency resource may be used for data transmission, thereby improving data transmission efficiency.

Further, the receiving unit 1301 is further configured to receive initially transmitted data of the first data or the retransmitted data of the first data. The processing unit 1302 is further configured to: verify whether the first data is correctly received, generate an ACK/NACK verification result, and generate an ACK if the first data is correctly received, or generate a NACK if the first data is not correctly received. A sending unit 1303 is configured to send the verification result.

The data transmission apparatuses shown in FIG. 12 and FIG. 13 are divided in terms of function. In an actual application scenario, a structure of the data transmission apparatus may alternatively be divided from a perspective of hardware. When functions of the data transmission apparatus are divided from the perspective of hardware, the data transmission apparatuses shown in FIG. 12 and FIG. 13 may have a same hardware structure. For example, both the data transmission apparatuses are UE, one UE serves as a first device, and the other UE serves as a second device. Certainly, the data transmission apparatuses shown in FIG. 12 and FIG. 13 may have different hardware structures. For example, the apparatus shown in FIG. 12 is UE, and the apparatus shown in FIG. 13 is a base station. It should be noted that in different communication processes, roles of the apparatus shown in FIG. 12 and the apparatus shown in FIG. 13 may also be interchanged. Based on this, the hardware structures of the data transmission apparatuses shown in FIG. 12 and FIG. 13 are described below by using a specific device.

Figure 14:
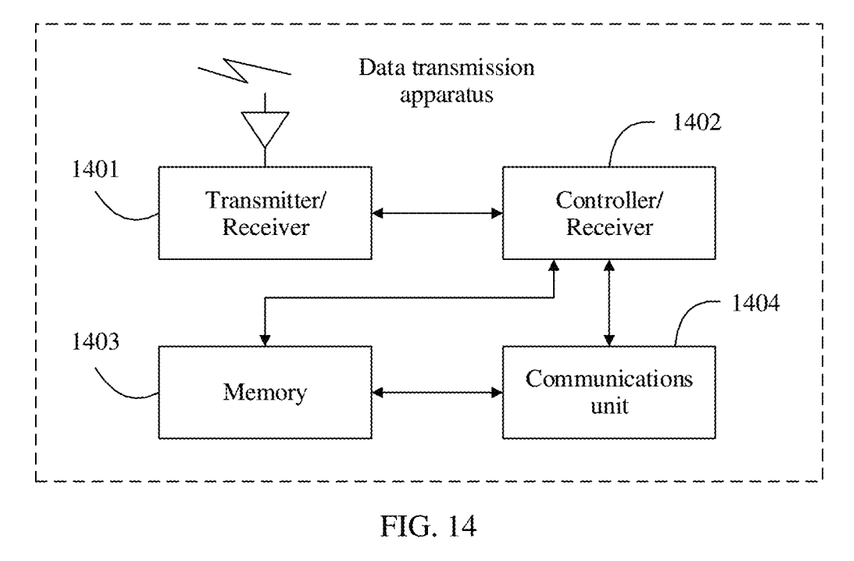
FIG. 14 is a schematic structural diagram of a second device according to an embodiment of this application.

FIG. 14 is a schematic structural diagram of still another data transmission apparatus according to an embodiment of the present invention. The data transmission apparatus shown in FIG. 14 includes a transmitter/receiver 1401, a controller/processor 1402, a memory 1403, and a communications unit 1404. The transmitter/receiver 1401 is configured to support radio communication between the apparatus and both a peer device and another network device.

When the data transmission apparatus shown in FIG. 14 is used as a hardware implementation structure of the data transmission apparatus shown in FIG. 12, the transmitter/receiver 1401 is configured to implement functions of the sending unit 1202 and the receiving unit 1203 in FIG. 12, and the controller/processor 1402 is configured to implement a function of the obtaining unit 1201 in FIG. 12. The memory 1403 is configured to store a program. Specifically, the program may include program code, and the program code includes a computer operation instruction. The memory 1403 may include a random access memory (RAM), and may further include a nonvolatile memory, for example, at least one magnetic disk storage. The controller/processor 1402 executes the program stored in the memory 1403, to implement functions performed by the first device in the method embodiments.

When the data transmission apparatus shown in FIG. 14 is used as a hardware implementation structure of the data transmission apparatus shown in FIG. 13, the transmitter/receiver 1401 is configured to implement functions of the sending unit 1303 and the receiving unit 1301 in FIG. 13, and the controller/processor 1402 is configured to implement a function of the processing unit 1302 in FIG. 13. The memory 1403 is configured to store a program. Specifically, the program may include program code, and the program code includes a computer operation instruction. The memory 1403 may include a random access memory (RAM), and may further include a nonvolatile memory, for example, at least one magnetic disk storage. The controller/processor 1402 executes the program stored in the memory 1403, to implement functions performed by the second device in the method embodiments.

It may be understood that FIG. 14 shows merely a simplified design of the data transmission apparatus. In actual application, the data transmission apparatus may include any quantity of transmitters, receivers, processors, controllers, memories, communications units, or the like, and all data transmission apparatuses that can implement the present invention fall within the protection scope of the present invention.

The controller/processor configured to perform functions of the foregoing data transmission apparatus in the present invention may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor.

It may be understood that when the embodiments of this application are applied to a first device chip, the first device chip implements a function of the foregoing obtaining unit 1201 or a function of the foregoing controller/processor 1402. The first device chip may send the first indication information and the second indication information to another module (for example, a radio frequency module or an antenna) of a first device. The first indication information and the second indication information are sent by the another module of the first device to a second device. Optionally, the first device chip may further receive the foregoing NACK information from the another module (for example, the radio frequency module or the antenna) of the first device, and the NACK information is sent by the second device to the first device.

When the embodiments of this application are applied to a second device chip, the second device chip implements a function of the foregoing processing unit 1302 or a function of the foregoing controller/processor 1402. The second device chip may receive the first indication information and the second indication information from another module (for example, a radio frequency module or an antenna) of a second device, and the first indication information and the second indication information are sent by a first device to the second device. Optionally, the second device chip may further send the foregoing NACK information to the another module (for example, the radio frequency module or the antenna) of the second device, and the NACK information is sent by the another module of the second device to the first device.

The method steps in the embodiments of this application may be implemented in a hardware manner or may be implemented in a manner of executing a software instruction by a processor. The software instruction may include a corresponding software module. The software module may be stored in a random access memory (RAM), a flash memory, a read-only memory (ROM), a programmable read-only memory (PROM), an erasable programmable read only memory (EPROM), an electrically erasable programmable read only memory (EEPROM), a register, a hard disk, a removable hard disk, a CD-ROM, or a storage medium in any other form well-known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in a sending device or a receiving device. Certainly, the processor and the storage medium may also exist in the sending device or the receiving device as discrete components.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a dedicated computer, a computer network, or another programmable apparatus. The computer instructions may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It may be understood that numerical symbols involved in the embodiments of this application are differentiated merely for ease of description, but are not used to limit the scope of the embodiments of this application.

It may be understood that sequence numbers of the foregoing processes do not mean execution sequences in the embodiments of this application. The execution sequences of the processes should be determined based on functions and internal logic of the processes, and should not be construed as any limitation on the implementation processes of the embodiment of this application.

The foregoing descriptions are merely specific implementations of the embodiments of this application. Any variation or replacement readily figured out by a person skilled in the art within the technical scope disclosed in this application shall fall within the protection scope of the embodiments of this application.

What is claimed is:

1. A method, comprising:
    sending, by a first device, first indication information, wherein the first indication information indicates a first time-frequency resource of a first reference signal, channel estimation on a first retransmission of first data is performed using the first reference signal, channel estimation on an initial transmission of the first data is performed using a second reference signal, and the first time-frequency resource of the first reference signal is different from a second time-frequency resource of the second reference signal; and
    sending, by the first device, the first retransmission of the first data.

2. The method according to claim 1, wherein the first indication information comprises information indicating a time-frequency location of the first reference signal.

3. The method according to claim 2, wherein the information indicating the time-frequency location comprises: a frequency domain spacing, a frequency domain offset, a time domain spacing, or a time domain offset.

4. The method according to claim 1, wherein the first indication information further indicates that the first device does not send the first reference signal for a second retransmission of the first data.

5. The method according to claim 1, further comprising:
    sending second indication information, wherein the second indication information indicates the second time-frequency resource of the second reference signal.

6. The method according to claim 5, wherein the first time-frequency resource of the first reference signal comprises R1 time-frequency resource units, the first time-frequency resource of the second reference signal comprises R2 time-frequency resource units, R1 is less than or equal to R2, R1 is an integer greater than or equal to 0, and R2 is a positive integer.

7. The method according to claim 1, wherein the first indication information is sent using physical layer control signaling, radio resource control layer signaling, or medium access control layer signaling.

8. The method of claim 1, wherein the first indication information indicates a change of the first time-frequency resource of the first reference signal for the channel estimation on the first retransmission of the first data relative to the second time-frequency resource of the second reference signal for the channel estimation on the initial transmission of the first data.

9. The method of claim 1, wherein a first frequency domain location of the first reference signal for the channel estimation on the first retransmission of the first data and a second frequency domain location of the second reference signal for the channel estimation on the initial transmission of the first data are staggered.

10. A method, comprising:
receiving, by a second device from a first device, first indication information, wherein the first indication information indicates a first time-frequency resource of a first reference signal, channel estimation on a first retransmission of first data is performed using the first reference signal, channel estimation on an initial transmission of the first data is performed using a second reference signal, and the first time-frequency resource of the first reference signal is different from a second time-frequency resource of the second reference signal; and
receiving, by the second device, the first retransmission of the first data.

11. The method according to claim 10, wherein the first indication information comprises information indicating a time-frequency location of the first reference signal.

12. The method according to claim 11, wherein the information indicating the time-frequency location comprises a frequency domain spacing, a frequency domain offset, a time domain spacing, or a time domain offset.

13. The method according to claim 10, wherein the first indication information further indicates that the first device does not send the first reference signal for a second retransmission of the first data.

14. The method according to claim 10, further comprising:
receiving second indication information, wherein the second indication information indicates the second time-frequency resource of the second reference signal.

15. The method according to claim 14, wherein the first time-frequency resource of the first reference signal comprises R1 time-frequency resource units, the first time-frequency resource of the second reference signal comprises R2 time-frequency resource units, R1 is less than or equal to R2, R1 is an integer greater than or equal to 0, and R2 is a positive integer.

16. An apparatus, comprising:
a processor; and
a non-transitory memory coupled to the processor and storing program instructions,
wherein the program instructions comprise instructions for:
sending first indication information, wherein the first indication information indicates a first time-frequency resource of a first reference signal, channel estimation on a first retransmission of first data is performed using the first reference signal, channel estimation on an initial transmission of the first data is performed using a second reference signal, and the first time-frequency resource of the first reference signal is different from a second time-frequency resource of the second reference signal; and
sending the first retransmission of the first data.

17. The apparatus according to claim 16, wherein the first indication information comprises information indicating a time-frequency location of the first reference signal.

18. The apparatus according to claim 17, wherein the information indicating the time-frequency location comprises: a frequency domain spacing, a frequency domain offset, a time domain spacing, or a time domain offset.

19. The apparatus according to claim 16, wherein the first indication information further indicates that the apparatus does not send the first reference signal for a second retransmission of the first data.

20. The apparatus according to claim 16, wherein the program instructions further comprise instructions for:
sending second indication information, wherein the second indication information indicates the second time-frequency resource of the second reference signal.

21. The apparatus according to claim 20, wherein the first time-frequency resource of the first reference signal comprises R1 time-frequency resource units, the first time-frequency resource of the second reference signal comprises R2 time-frequency resource units, R1 is less than or equal to R2, R1 is an integer greater than or equal to 0, and R2 is a positive integer.

22. The apparatus according to claim 16, wherein the first indication information is sent using physical layer control signaling, radio resource control layer signaling, or medium access control layer signaling.

* * * * *